(12) United States Patent
Vaze et al.

(10) Patent No.: US 10,263,669 B2
(45) Date of Patent: Apr. 16, 2019

(54) TIERED CONTROL OF ITERATIVE MIMO RECEIVERS

(71) Applicant: QUALCOMM Incorporated, San Diego, CA (US)

(72) Inventors: Chinmay Vaze, San Diego, CA (US); Prashant Udupa Sripathi, San Jose, CA (US); Supratik Bhattacharjee, San Diego, CA (US); Michael McCloud, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/684,685

(22) Filed: Aug. 23, 2017

(65) Prior Publication Data

US 2018/0062709 A1 Mar. 1, 2018

Related U.S. Application Data

(60) Provisional application No. 62/380,296, filed on Aug. 26, 2016.

(51) Int. Cl.
*H04B 7/08* (2006.01)
*H04L 1/00* (2006.01)
(Continued)

(52) U.S. Cl.
CPC ............. *H04B 7/0413* (2013.01); *H04B 7/08* (2013.01); *H04B 17/29* (2015.01); *H04L 1/005* (2013.01);
(Continued)

(58) Field of Classification Search
CPC ........................................ H04L 1/005
See application file for complete search history.

(56) References Cited

U.S. PATENT DOCUMENTS 5,889,857 A * 3/1999 Boudy ................. H04M 9/082
370/291
8,621,319 B2 12/2013 Moon et al.
(Continued)

OTHER PUBLICATIONS

Zang et al., "LTE-Advanced Air Interface Technology", p. 465 (Year: 2013).*
(Continued)

*Primary Examiner* — Ross Varndell
(74) *Attorney, Agent, or Firm* — Arent Fox, LLP

(57) ABSTRACT

In order to balance the power requirements of a MIMO receiver with the gains that may be achieved through its use, an apparatus determines whether a current configuration of the UE supports iterative MIMO reception. When it is determined that the current configuration of the UE supports iterative MIMO reception, the apparatus determines whether at least one parameter of the received signal is within a corresponding target condition, respectively, for each of the at least one parameters, e.g., including determining whether a scheduling percentage meets a scheduling threshold and whether an error rate is within an error rate range. When both the configuration supports iterative MIMO reception and the signal parameter(s) meet the corresponding target condition(s), the apparatus uses the iterative MIMO receiver. If not, the apparatus uses a serial receiver.

24 Claims, 11 Drawing Sheets

(51) Int. Cl.
    *H04B 17/29*     (2015.01)
    *H04L 25/03*     (2006.01)
    *H04B 7/0413*     (2017.01)

(52) U.S. Cl.
    CPC ............... *H04L 25/03006* (2013.01); *H04L 2025/03732* (2013.01); *H04L 2025/03764* (2013.01)

(56) References Cited

U.S. PATENT DOCUMENTS

| | | | |
|---|---|---|---|
| 2005/0163041 A1 | 7/2005 | Ikram et al. | |
| 2010/0271988 A1* | 10/2010 | Jia .................. | H04J 11/004 370/280 |
| 2011/0145671 A1* | 6/2011 | Moon ................. | H04L 1/0048 714/748 |

OTHER PUBLICATIONS

International Search Report and Written Opinion—PCT/US2017/048490—ISA/EPO—dated Oct. 18, 2017.

* cited by examiner

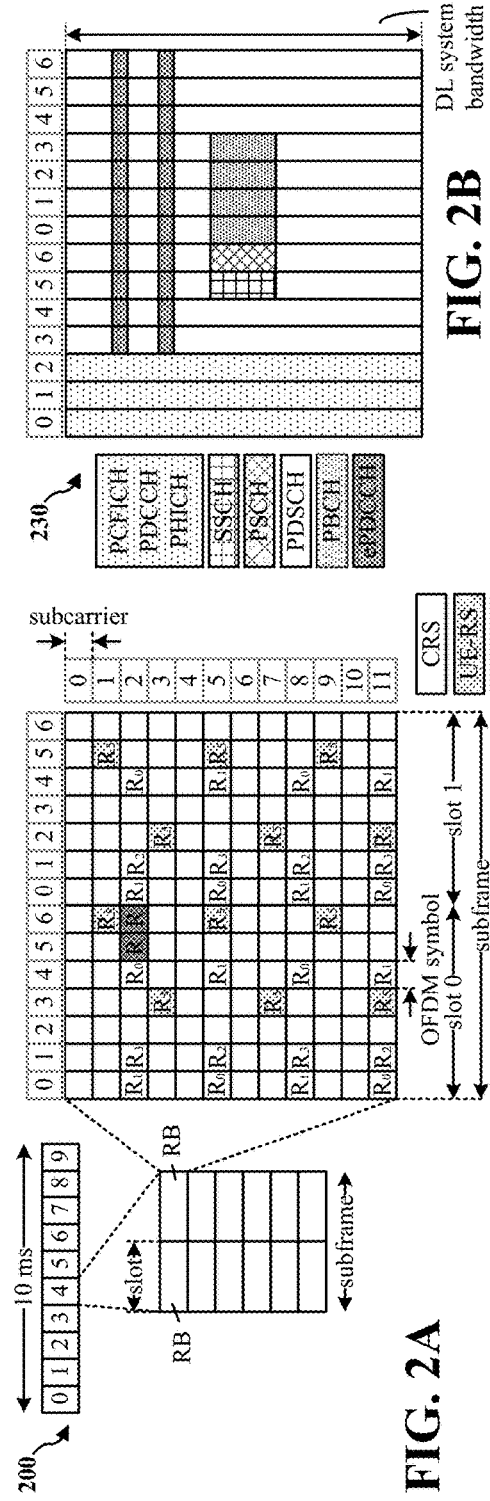
FIG. 2A
FIG. 2B
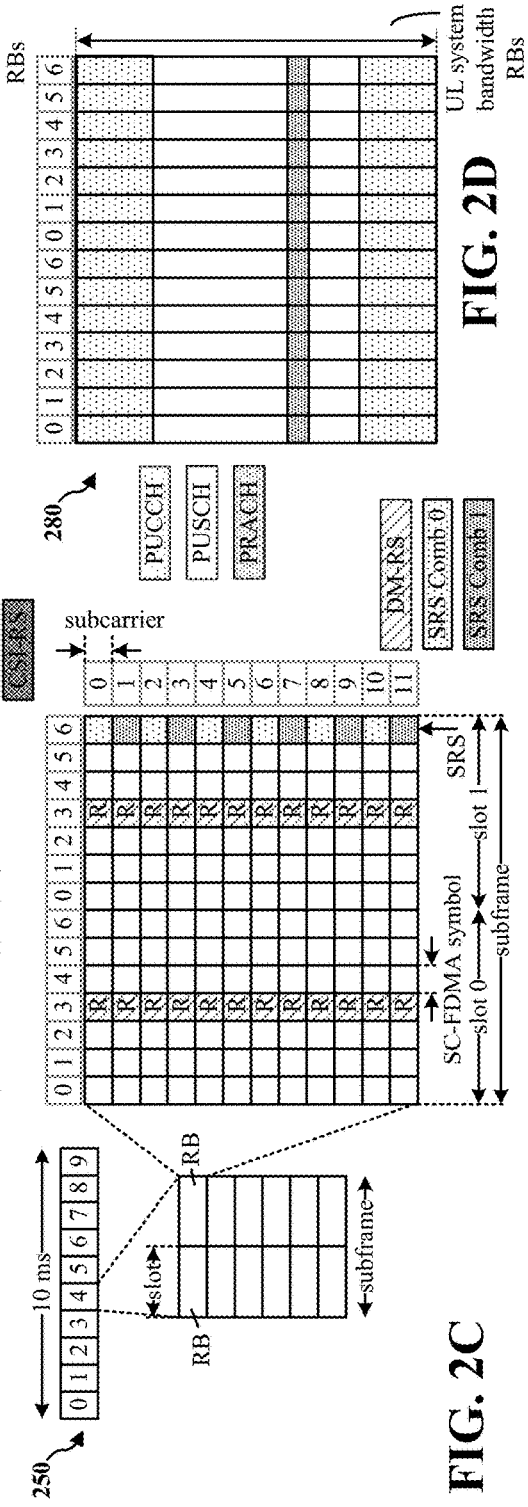
FIG. 2C
FIG. 2D

TIERED CONTROL OF ITERATIVE MIMO RECEIVERS

CROSS-REFERENCE TO RELATED APPLICATION

This application claims the benefit of U.S. Provisional Application Ser. No. 62/380,296, entitled "Tiered Control of Iterative MIMO Receivers" and filed on Aug. 26, 2016, which is expressly incorporated by reference herein in its entirety.

BACKGROUND

Field

The present disclosure relates generally to communication systems, and more particularly, to tiered control for an iterative Multiple-Input Multiple-Output (MIMO) receiver.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Iterative MIMO receivers exchange soft information between a demapper and decoder and may achieve better performance than their non-iterative counterparts. While iterative MIMO receivers improve throughput gains, this improvement comes at the cost of increased power consumption due to the intense computations performed by the iterative MIMO.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A serial receiver performs just a single demodulation/decoding pass through a demapper and decoder when receiving a signal. In contrast, an iterative MIMO receiver performs multiple iterations, using soft information exchange, e.g., in the form of extrinsic Log Likelihood Ratios (LLRs), between a demapper and decoder when receiving and processing a signal. Iterative MIMO receivers achieve better performance than their non-iterative counterparts. Iterative MIMO receivers achieve greater gains in fading channels when the channel conditions are neither too high nor too low, e.g., when packet error rate is neither below a minimum threshold, e.g., as below 5%, nor above a maximum threshold, e.g., above 50%. While Iterative MIMO receivers may provide improved signal reception, iterative MIMO receivers consume more power than a serial receiver due to the added computations performed by the iterative MIMO receiver. Therefore, there is a need to balance the power requirements of the MIMO receiver with the gains that may be achieved through its use in order to minimize the impact on power consumption while taking advantage of the potential gain improvement.

Aspects presented herein provide modem power control for an iterative MIMO receiver, e.g., using a tiered controller. The tiered controller may make a first determination regarding using the iterative MIMO receiver based on a current configuration. When the current configuration is determined to support iterative MIMO, the controller may make a second determination regarding the suitability of the iterative MIMO receiver based on scheduling rate and/or a signal quality metric such as an error rate. The first determination may be an event driven determination based on slowly varying parameters. The second determination may be a statistical determination that is periodically repeated. Using this tiered control, the iterative MIMO receiver may be enabled only when both the configuration is appropriate and at least a certain amount of gain can be achieved based on the scheduling rate/packet error rate. When the configuration is not appropriate or the operating conditions are not within the defined bounds, the iterative MIMO receiver may not be enabled, and power consumption my be reduced.

In an aspect of the disclosure, a method, a computer-readable medium, and an apparatus are provided for performing tiered control of an iterative MIMO receiver. The apparatus determines whether at least one parameter of the received signal is within a corresponding target condition, respectively, for each of the at least one parameters, e.g., including determining whether a scheduling percentage meets a scheduling threshold and whether an error rate is within an error rate range. When both the configuration supports iterative MIMO reception and the signal parameter(s) meet the corresponding target condition(s), the apparatus uses the iterative MIMO receiver. If not, the apparatus uses a serial receiver.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
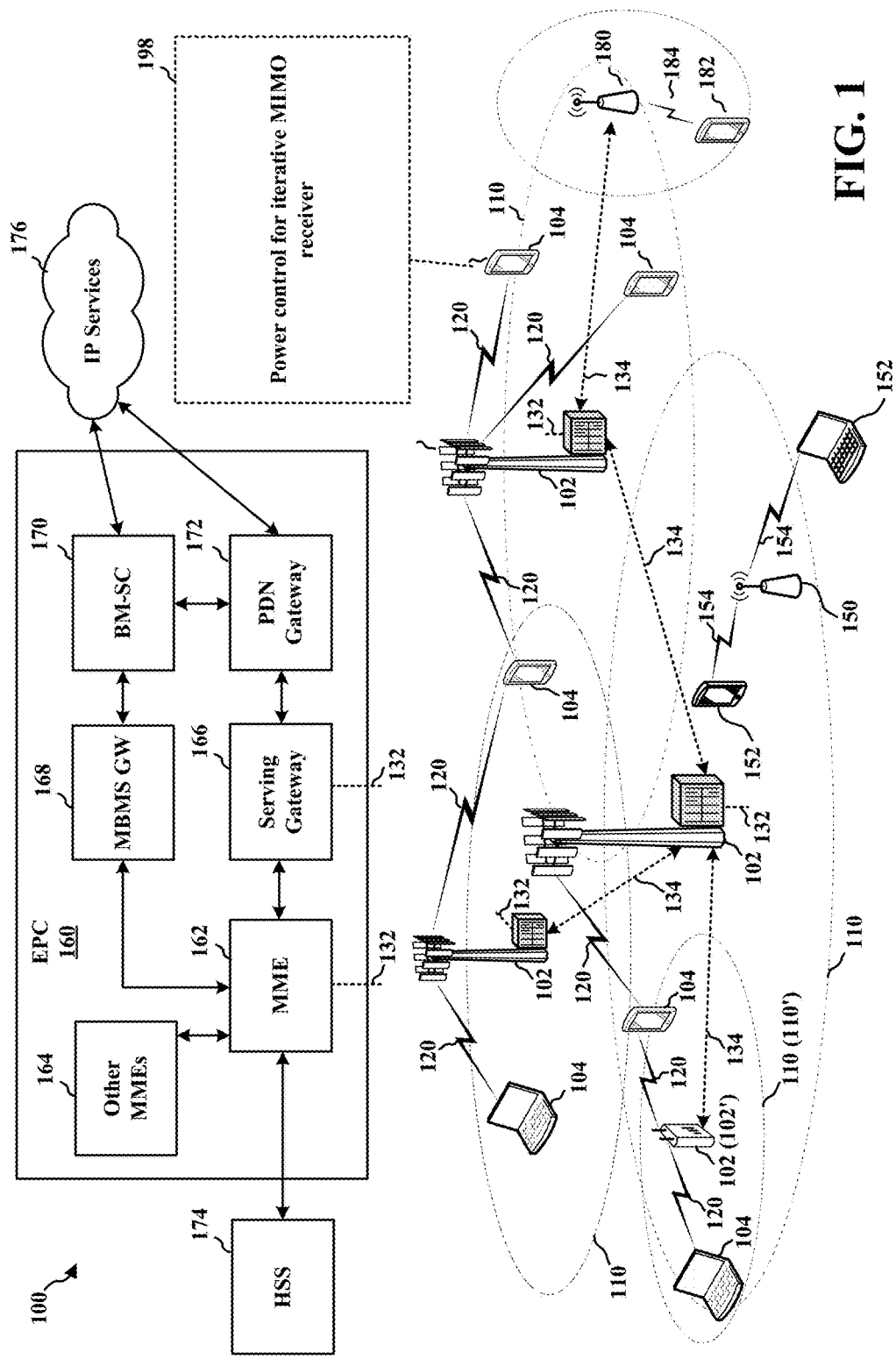
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform power control of an iterative MIMO receiver (198), e.g., controlling transitions between a serial receiver and an iterative MIMO receiver.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
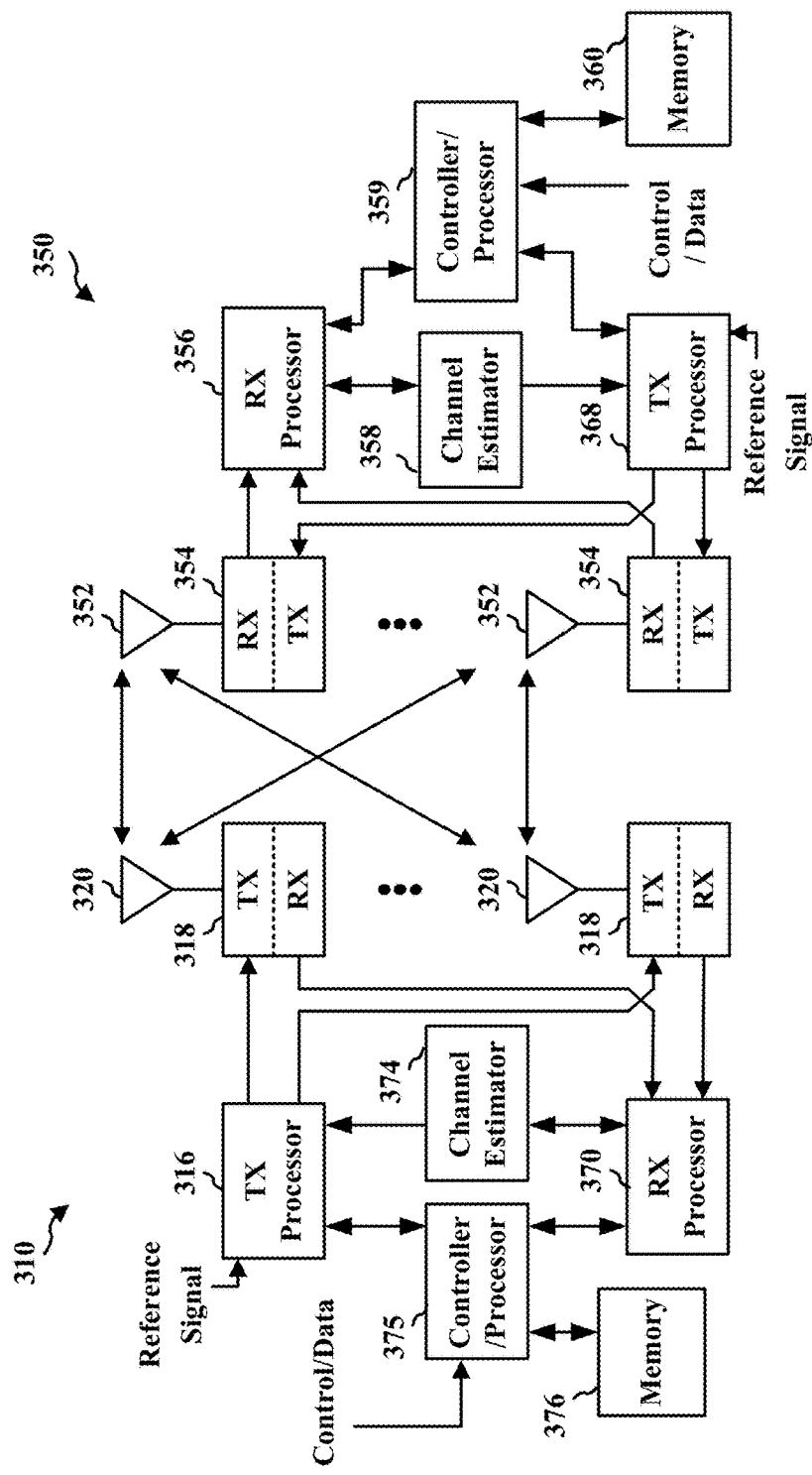
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4A:
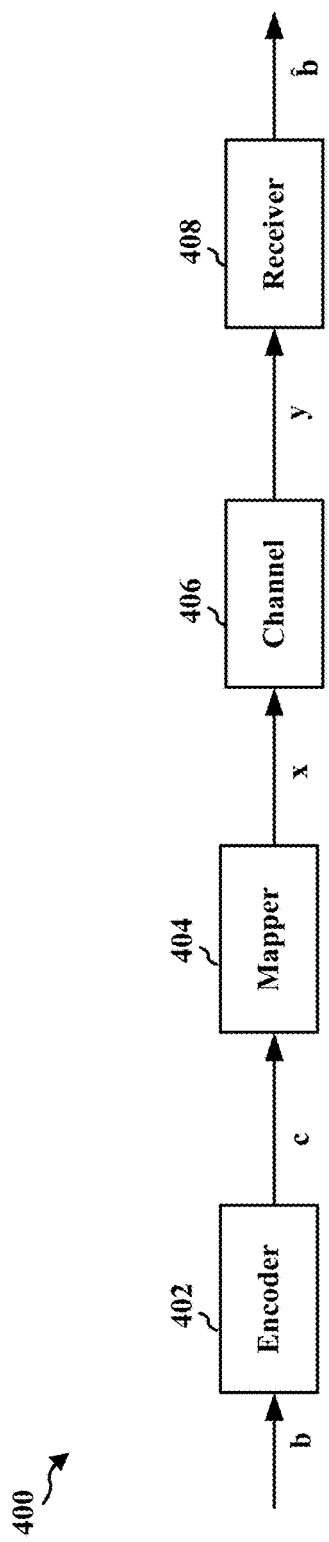
FIG. 4A illustrates an example configuration for a wireless communication system.

A serial receiver performs just a single demodulation/decoding pass through a demapper and decoder when receiving a signal. FIG. 4A illustrates an example model of a communication system 400, such as a communication system employed between eNB 102 and UE 104 in FIG. 1. Before being transmitted, e.g., by eNB 102, information bits b may be encoded by an encoder 402 that generates coded bits c. The encoded signal c may then be mapped by mapper 404 onto modulation symbols to generate symbols x that are transmitted by the eNB 102 using channel 406 as signal y. The receiver 408 (e.g., UE 104 in FIG. 1) receives signal y on the channel and processes the signal in order to determine the information bits that the signal y represents. The receiver 408 processes the received signal y to estimate the information as b^. A goal of the communication system, and especially of the receiver, is to have the information bits estimated by the receiver 408 b^ match the original information bits b input into the encoder 402 as closely as possible.

Figure 4B:
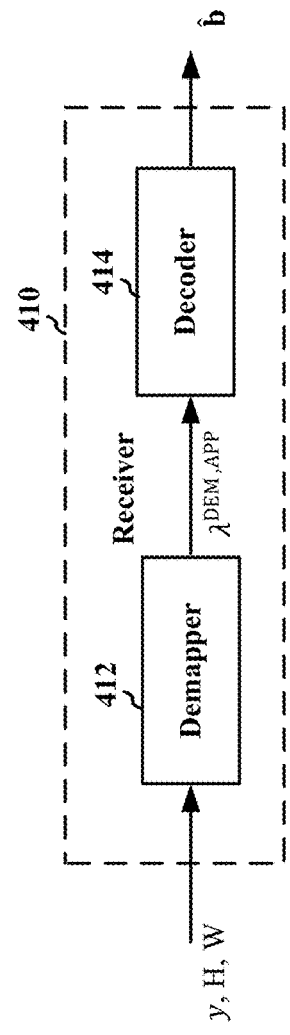
FIG. 4B illustrates example aspects of a serial receiver in a wireless communication system.

FIG. 4B illustrates aspects of a serial receiver 410 that may be employed as receiver 408 in the communication system. The receiver includes a demapper 412 and a decoder 414 that demodulate/decode the received signal. The demapper 410 obtains the received signal, distinguishes the channel as part of a channel estimation process, and computes a-posterior LLRs of the coded bits. In FIG. 4B, y represents the received signal, H represents a channel matrix, and W represents a whitening matrix. The LLRs calculated by the demapper indicate a likelihood the coded bits may be a 0 or 1. The demapper 412 outputs the LLRs of the received, coded bits to the decoder 414, as $\lambda^{DEM, APP}$, $\lambda^{DEM, APP}$ representing an a-posterior LLR from demapper 412. The decoder 414 attempts to undo the operation performed by the encoder 402. The decoder computes a-posterior LLRs of the information bits and outputs an estimation b^ of information bits b. The final estimation b^ may be based on a sign of the LLR for a corresponding bit. The serial receiver performs a single pass of the received signal through the demapper 412 and decoder 414 in order to generate an estimation of the information bits.

Figure 5:
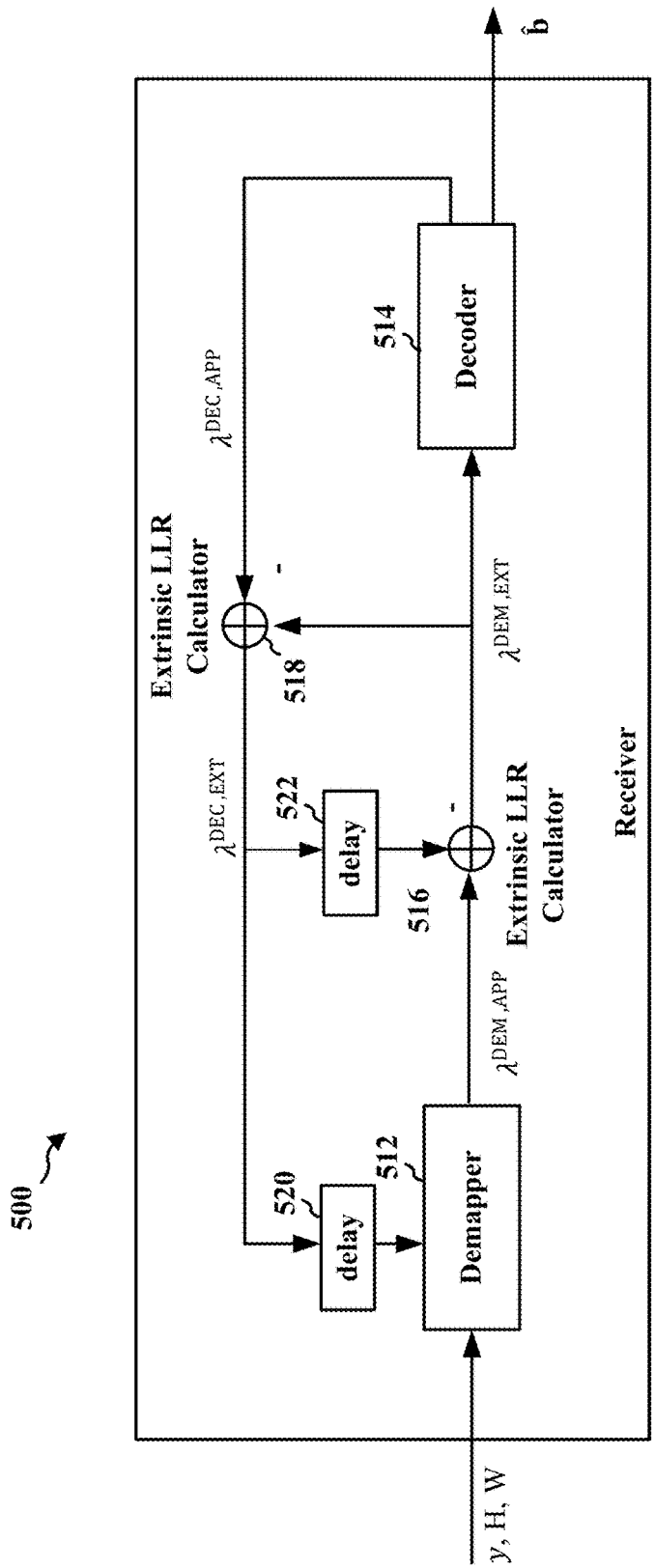
FIG. 5 illustrates example aspects of an iterative MIMO receiver.

FIG. 5 illustrates an example of an iterative MIMO receiver 500 that may be employed as the receiver 408 in the communication system 400 in FIG. 4A. The iterative MIMO receiver 500 performs multiple iterations, using soft information exchange, e.g., in the form of extrinsic LLRs, between a demapper 512 and decoder 514 when receiving a signal. The receiver 500 in FIG. 5 receives a signal, represented by y, H, W, on the transmission channel, e.g., from eNB 102 in FIG. 1. The receiver 500 may be a component within UE 104 in FIG. 1. The demapper 512 outputs the LLRs of the received signal, e.g., coded bits, to the decoder 514, as $\lambda^{DEM, APP}$. An extrinsic LLR calculator 516 passes the estimated bits to the decoder 514. On the first pass, the estimation $\lambda^{DEM, EXT}$ provided from the extrinsic LLR calculator 516 to the decoder 514 is the same estimation $\lambda^{DEM, APP}$ that the extrinsic LLR calculator receives from the demapper 512, e.g. $\lambda^{DEM, EXT} = \lambda^{DEM, APP}$. The decoder then computes a-posterior LLRs of the coded bits in addition to the estimation of the information bits. A CRC check may be performed on the information bits. If failed, it may indicate an error, and the iterative MIMO receiver may perform another iteration of the demapper and decoder. The output of the decoder $\lambda^{DEC, APP}$ and the input $\lambda^{DEM, EXT}$ to the decoder may be received by a second extrinsic LLR calculator 518 in order to determine the new information added by the computation at the decoder. The difference between $\lambda^{DEM, APP}$ and $\lambda^{DEM, EXT}$ is then fed back to the demapper 512.

Thus, the feedback extrinsic information $\lambda^{DEC, EXT} = \lambda^{DEM, APP} - \lambda^{DEM, EXT}$ provided to the demapper for the second iteration. In the second iteration, a second set of estimation is produced by the demapper using the feedback extrinsic information $\lambda^{DEC, EXT}$ LLRs as priors to compute a new, refined set of LLRs estimating the coded bits. Delay 520 and 522 illustrate that feedback generated in one iteration may be consumed, e.g., used, during the next iteration. The delays enable the system to clear between iterations. The extrinsic LLR calculator 516 propagates the extrinsic information for the second iteration as $\lambda^{DEC, EXT} = \lambda^{DEM, APP} - \lambda^{DEM, EXT}$. The decoder 514 uses the propagated extrinsic information to perform another iteration of decoding. Another CRC check may be performed, and additional iterations may be performed based on the results of the CRC check. The final estimation b^ may be based on a sign of the LLR for a corresponding bit.

When performing iterative MIMO reception, multiple streams of information may be processed simultaneously. Feedback for one stream of information may be used to improve the estimations for the other streams of information.

Iterative MIMO receivers achieve better performance than their non-iterative counterparts. Iterative MIMO receivers achieve greater gains in fading channels. For example, improved gains may be achieved by an iterative MIMO receiver when the channel conditions are neither too good nor too bad, e.g., when packet error rate, e.g., a BLER, is neither below a minimum threshold nor above a maximum threshold. The minimum threshold may be, e.g., 5% and the maximum threshold may be 50%, providing an error rate range of 5-50%. In another example, the maximum threshold may be 95%, providing a range between 5-95%. In another example, the minimum threshold may be higher, e.g., closer to 10%. Thus, gains from iterative receiver may be observed prominently when error is neither too low nor too high, e.g., when it is between bounds 5% and 95%. Iterative MIMO receivers consumer more power than a serial receiver due to the added computations performed by the iterative MIMO receiver. There is a power impact for performing the multiple iterations. Iterative MIMO requires higher processing power and needs an increased clock speed of the modem, which is related to an increase in voltage and an increase in power consumption. Therefore, there is a need to balance the power requirements of the MIMO receiver with the gains that may be achieved through its use in order to minimize the impact on power consumption while taking advantage of the potential gain improvement.

Figure 6:
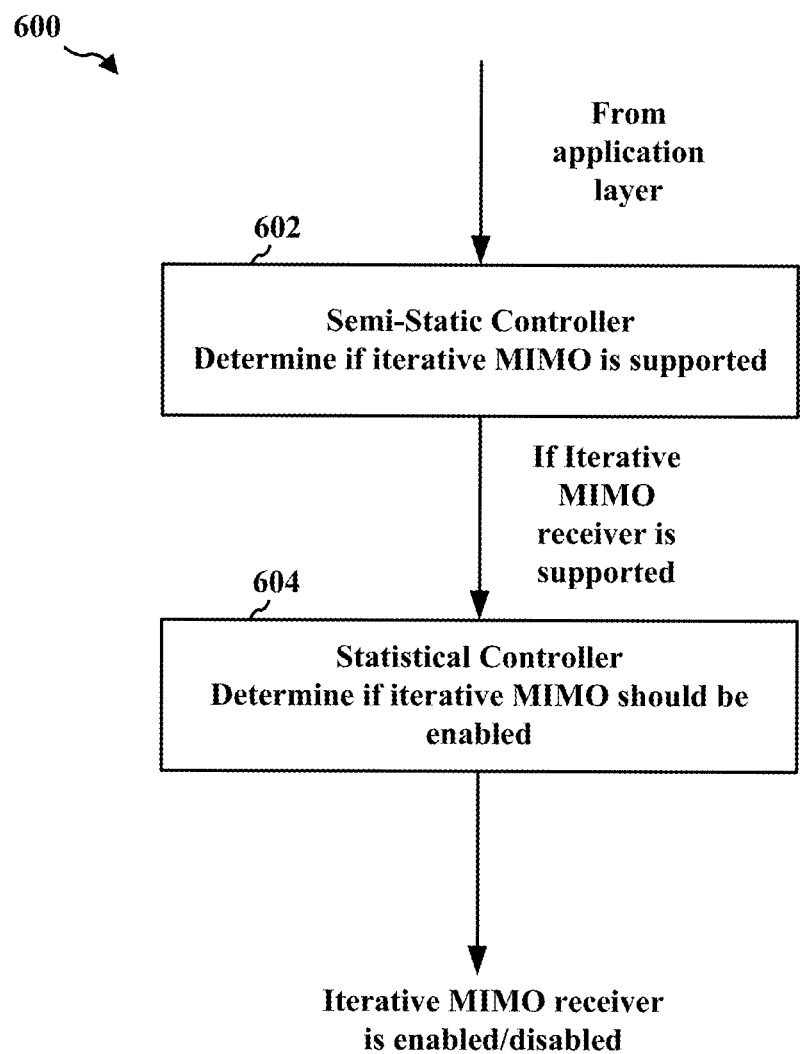
FIG. 6 illustrates an example controller for providing tiered control of an iterative MIMO receiver.

FIG. 6 illustrates an example controller architecture 600 for modem power control for an iterative MIMO receiver, e.g., using a tiered controller. The controller architecture may be implemented in, e.g., UE 104, 350. A semi-static controller 602 may receive configuration information from the application layer and may make a first determination regarding using the iterative MIMO receiver based on whether a current configuration supports iterative MIMO reception.

This first determination may be an event driven determination based on parameters that vary infrequently, such as transmission mode. For example, iterative MIMO reception may be determined to be appropriate for a transmission mode where more than one layer is transmitted. Additional configuration information considered by the semi-static controller 602 may include any of a number of reception antennas, a call type, etc. The determination by the semi-static controller 602 may be repeated when input parameters change, e.g., when an RRC reconfiguration message is received. The determination by the semi-static controller, also referred to herein as a first tier determination, provides an initial estimate of the feasibility of iterative MIMO reception.

If the current configuration does not support using the iterative MIMO receiver, a serial receiver, similar to the serial receiver discussed in connection with FIG. 4B may be used to process the received signal.

When the current configuration is determined to support an iterative MIMO receiver, a statistical controller 604 may make a second determination regarding the suitability of the iterative MIMO receiver, e.g., based on scheduling rate and/or a signal quality metric such as an error rate. The statistical controller 604 may receive scheduling information and error rate statistics in order to perform the determination. Based on the determination from the statistical controller 604, the iterative MIMO receiver may be enabled or disabled.

The second determination may be a statistical determination that is periodically repeated. For example, the determination may be repeated every 80 ms or every 160 ms. For example, a period of 80 ms may be used. If the number of transitions between iterative MIMO reception and serial reception goes beyond a transition threshold within a defined period of time, the period may be increased to 160 ms in order to avoid having a high number of transitions between the iterative MIMO receiver and the serial receiver. In another example, the length of the evaluation period may initially be set to 80 ms. Whenever the controller makes a transition from iterative receiver to serial receiver, the length of the evaluation period may be doubled until it hits a maximum value of, e.g., 640 ms. Even when the configuration has not changed, the statistical controller 604 may control transitions between serial reception and iterative MIMO reception based on changing statistical information and error rate statistics.

Using this tiered control, the iterative MIMO receiver may be enabled only when the configuration is appropriate and when at least a certain amount of gain can be achieved based on the scheduling rate/packet error rate. When either the configuration is not appropriate or the operating conditions are not within the defined bounds, the iterative MIMO receiver may not be enabled, and power consumption may be reduced.

In considering the scheduling percentage, the statistical controller 604 may determine to enable iterative MIMO reception only when scheduling of transmission modes with a rank greater than 1 is frequent enough, e.g., when a percentage of scheduling of transmission modes with a rank greater than 1 is above a threshold.

Figure 7:
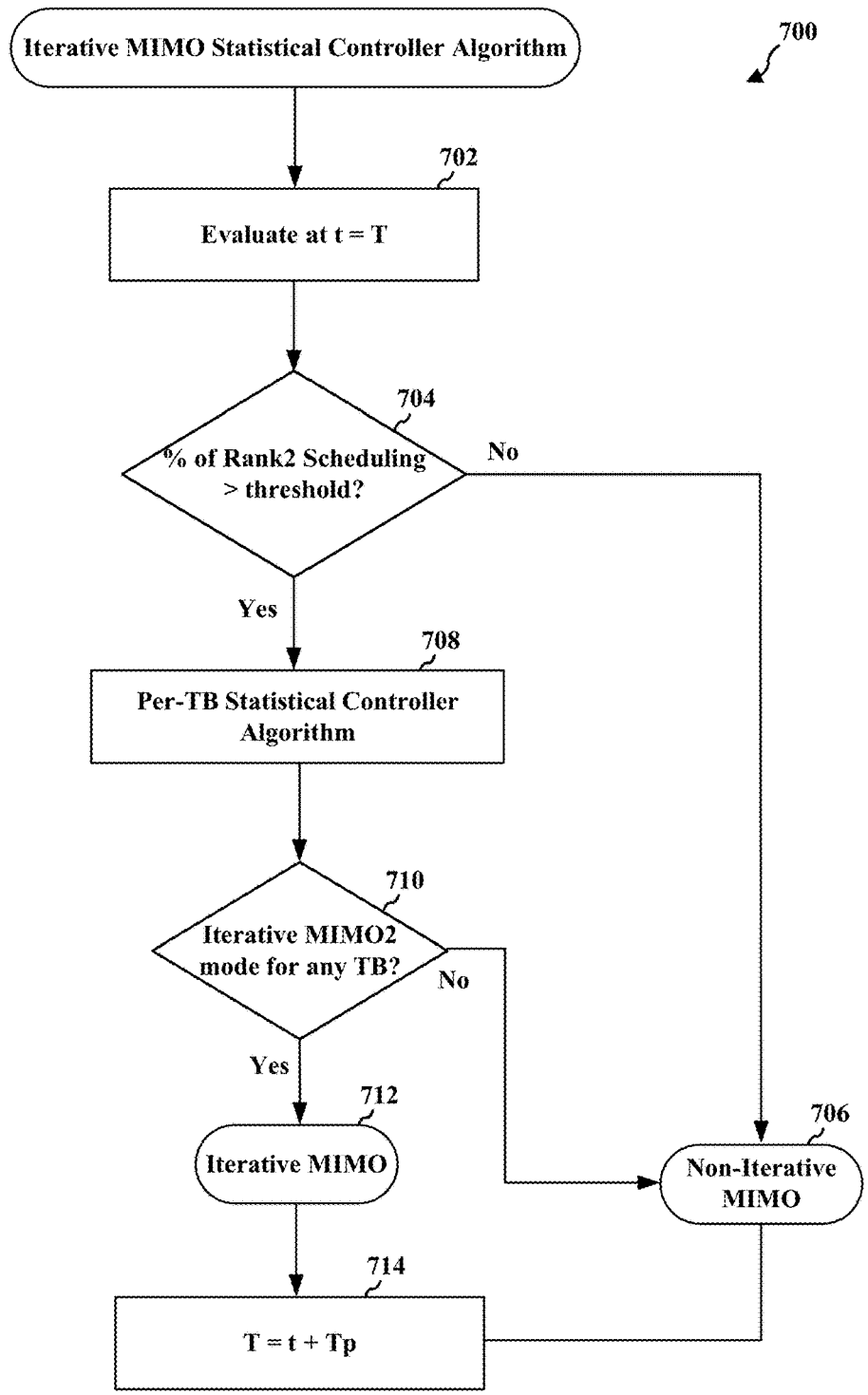
FIG. 7 illustrates an example algorithm for controlling an iterative MIMO receiver.

FIG. 7 illustrates an example algorithm 700 that may be performed by the statistical controller 604 when considering whether iterative MIMO should be enabled. At 702, the evaluation begins at a decision boundary, time T=an initial time t. At 704, the statistical controller 604 determines whether a percentage of transmissions having a rank greater than 1 meets a scheduling threshold. The percentage of transmissions having a rank greater than 1 is determined as a number of subframes (SF) with a rank 1 or more scheduling divided by a total number of downlink (DL) subframes over T ms of time, e.g.:

$$\% \text{ scheduling with rank} > 1 = \frac{\{\{100 \times (\text{number of } SFs \text{ with rank} > 1 \text{ scheduling})\}\}}{\text{Total number of } DLSFs \text{ over } T \text{ ms}}$$

If the calculated scheduling percentage is not greater than the scheduling threshold, serial reception may be used to demap and decode the received signal at 706. If the calculated scheduling percentage is greater than the scheduling threshold, the statistical controller may continue to make additional statistical determinations at 708. The additional statistical determination at 708 may be based on an error rate, as described in connection with FIG. 8.

As there are multiple streams, the statistical controller may monitor the error rate for each of the multiple streams independently as illustrated at 710 and make its determination regarding iterative MIMO reception based on the error rate for each of the individual streams. If the error rate falls within the defined range for one of the individual streams, the iterative MIMO receiver may be enabled and iterative MIMO reception may be performed for each of the multiple streams at 712. In another example, the statistical controller may determine to use the iterative MIMO receiver when a certain number of individual streams have an error rate within the defined range, e.g., when at least 2 streams, at least 3 streams, etc. If the error rates for each of the individual streams is outside the range, then the statistical controller may determine that iterative MIMO is not needed for any of the streams. The statistical controller may disable iterative MIMO reception and instead use serial reception for each of the streams at 706.

The next evaluation boundary will occur at time T=t+Tp, where Tp is the length of the evaluation period, e.g., 80 ms or 160 ms.

In considering the error rate, the statistical controller 604 may disable iterative MIMO reception and use serial reception for the exceptional scenarios, when an error rate such as a block error rate (BLER) is either too high or too low. Thus, the statistical controller 604 may determine whether the error rate is within a range, being both above a bottom threshold and below and upper threshold. An example of such an error rate range may be, e.g., between 5%-50%. This is one example, only. The range may encompass a different error rate range.

Figure 8:
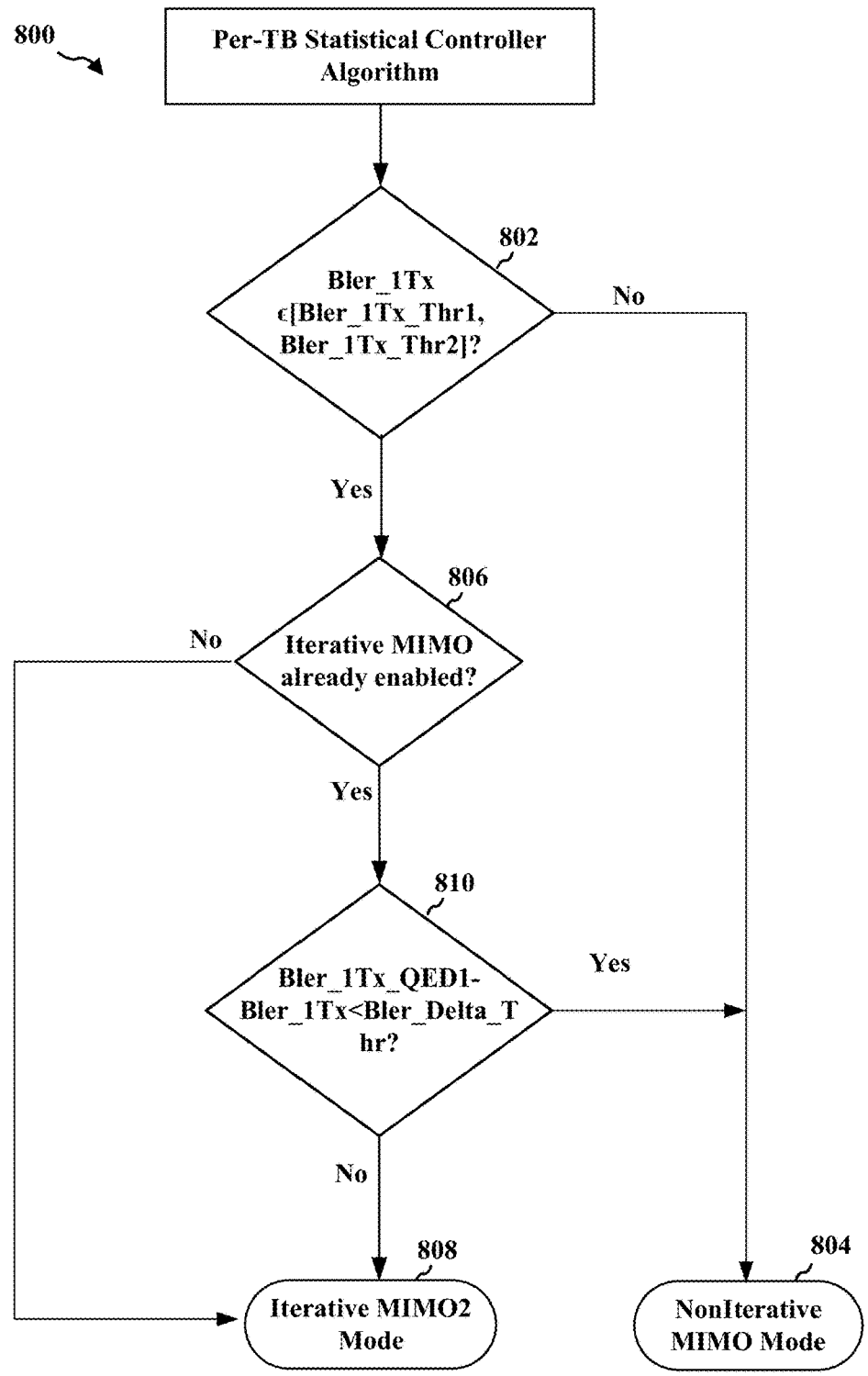
FIG. 8 illustrates an example algorithm for controlling an iterative MIMO receiver.

FIG. 8 illustrates an example algorithm 800 that may be performed by the statistical controller 604 when considering the error rate, e.g., at 708. As there are multiple streams, the statistical controller may monitor the error rate for each of the multiple streams independently and make its determination regarding iterative MIMO reception based on the error rate for each of the individual streams, e.g., as discussed in connection with 710. Thus, the algorithm illustrated in FIG. 8 may be performed individually for each of the individual streams. For example, as a part of the determination, the UE may maintain error rate statistics for new transmissions having a rank greater than 1. In the iterative MIMO reception mode, the UE may segregate the error rate statistics across different iterative MIMO iterations and also across different streams.

At 802, the statistical controller determines whether an error rate, such as a BLER, for the stream is within a defined error rate range. For example the statistical controller may determine whether the BLER is above a first error rate threshold and below a second error rate threshold. This ensures that the error rate is not too low or too high to make use of the benefits of iterative MIMO reception. In the figure, Bler_1Tx is the first BLER over a period T for the transmission. If the BLER for the stream does not fall within the error rate range because it is lower than the first threshold or higher than the second threshold, the statistical controller determines to disable iterative MIMO reception and use serial reception at 804. If the BLER does fall within the range, the statistical controller determines whether iterative MIMO reception was already enabled at 806. As the statistical controller makes periodic determinations, the UE may currently be performing iterative MIMO reception when the determination at 806 is made. If the BLER is within the error rate range and iterative MIMO reception has not been enabled, the statistical controller determines to enable iterative MIMO reception at 808. If iterative MIMO reception is enabled at 806, then the statistical controller determines at 810 whether a difference between the error rate after a first iteration and the error rate of the original transmission meets an error rate change threshold BLER_Delta_Thr. In FIG. 8, Bler_1Tx_QED1 is a first BLER after a first iteration of iterative MIMO reception. If the change in error rate is less than the error rate change threshold, the statistical controller determines to use serial reception at 804. If the change in error rate is greater than the error rate change threshold, the statistical controller determines to use iterative MIMO reception at 808.

Figure 9:
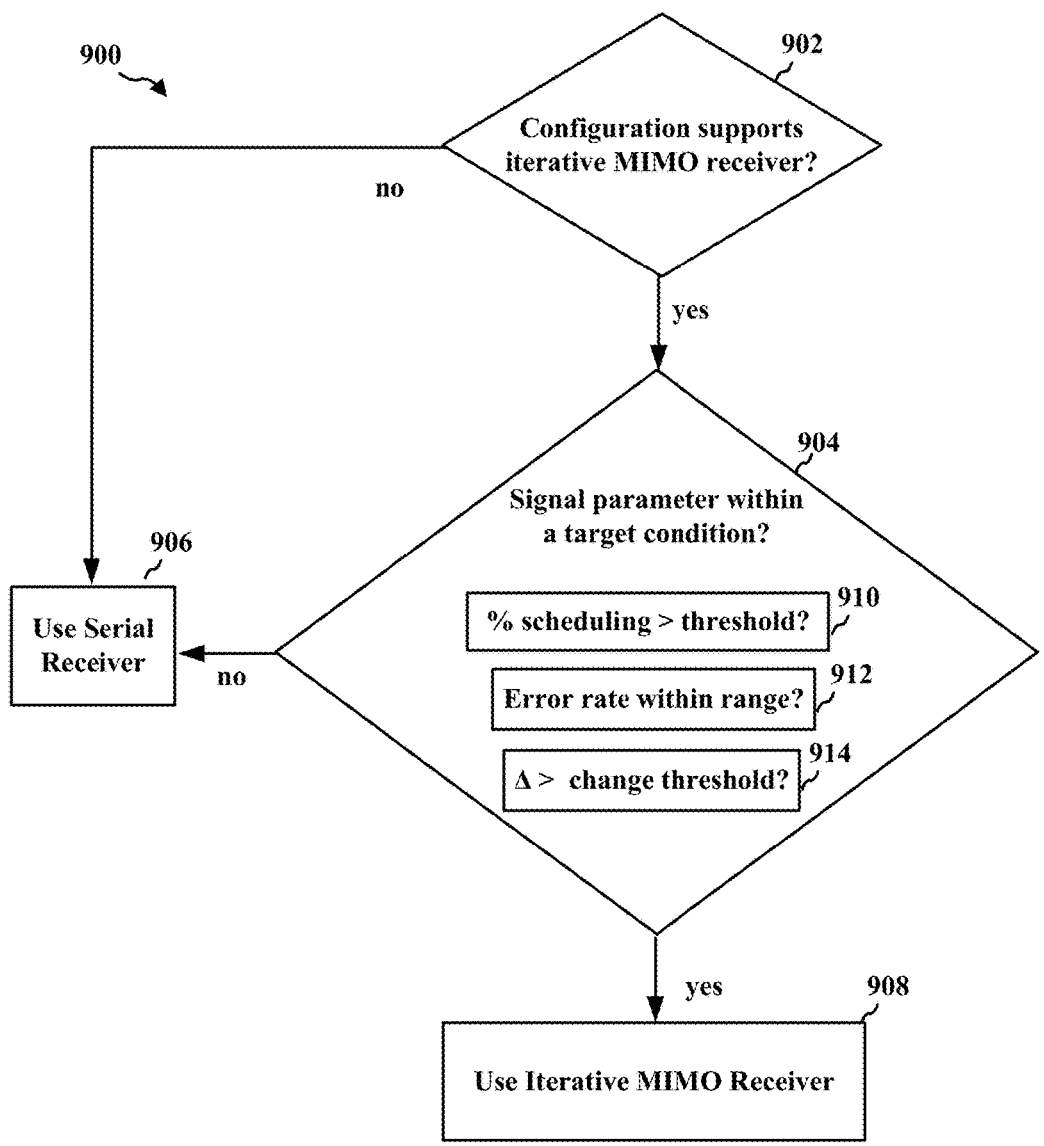
FIG. 9 is a flowchart of an example method of wireless communication.

FIG. 9 is a flowchart 900 of a method of wireless communication for performing tiered control of an iterative MIMO receiver. The method may be performed by a UE (e.g., the UE 104, 350, the apparatus 1002/1002'). At 902, the UE determines whether a current configuration of the UE supports iterative MIMO reception. This determination may include aspects of the determination made by the semi-static controller 602 in FIG. 6. The determination at 902 may be based on at least one of a number of reception antennas, a transmission mode, and a call type. If the UE determines that the current configuration does not support iterative MIMO reception, the UE determines to use a serial receiver. Then, the UE receives a signal using serial reception at 906, e.g., as described in connection with FIG. 4B.

When the UE determines at 902 that the current configuration of the UE supports iterative MIMO reception, the UE then determines at 904 whether at least one parameter of the received signal is within a corresponding target condition, respectively, for each of the at least one parameters. The determination at 904 may include aspects of the determination made by the statistical controller 604 in FIG. 6. When it is determined at 904 that the at least one parameter of the received signal is not within a corresponding target condition, the UE receives a signal using serial reception at 906, e.g., by disabling the iterative MIMO receiver. When the UE determines that the at least one parameter of the received signal is within a corresponding target condition, the UE receives the signal using iterative MIMO reception at 908, e.g., by enabling the iterative MIMO receiver. The UE then receives the signal using iterative MIMO reception, e.g., as described in connection with FIG. 5.

The determination at 904 may include multiple determinations. For example, the determination at 904 may include determining whether a percentage of scheduling is above a first threshold at 910. This may include aspects of the algorithm of FIG. 7.

The determination at 904 may include determining whether an error rate is within a target range at 912. For example, the UE may determine whether the error rate is above a first error rate threshold and below a second error rate threshold. This may include aspects of the algorithms of FIG. 7 and FIG. 8. For example, a received signal may comprise multiple streams, and the US may determine at 904 whether the packet erasure rate is within the target range individually for each of the multiple streams, and if the packet erasure rate for at least one of the multiple streams is within the target range, the iterative MIMO receiver is used at 908. As another example, the determination at 904 may include determining whether a difference between a first error rate at the first iteration and an overall error rate meets an error rate change threshold at 914. The UE may use the iterative MIMO receiver at 908 when the difference meets the error rate change threshold and may use the serial receiver at 906 when the difference does not meet the error rate change threshold.

The determination at 902 may be repeated each time the current configuration of the UE changes. Therefore, the determination at 902 may be event drive, such as described for semi-static controller 602. The determination at 904 may be repeated on a periodic basis, e.g., every 80 ms or 160 ms, as described for the statistical controller 604 in FIG. 6. For example, the UE may transition between iterative MIMO reception at 908 and serial reception at 906 depending on a periodic determination at 904 of whether at least one parameter of the received signal is within the corresponding target condition.

Figure 10:
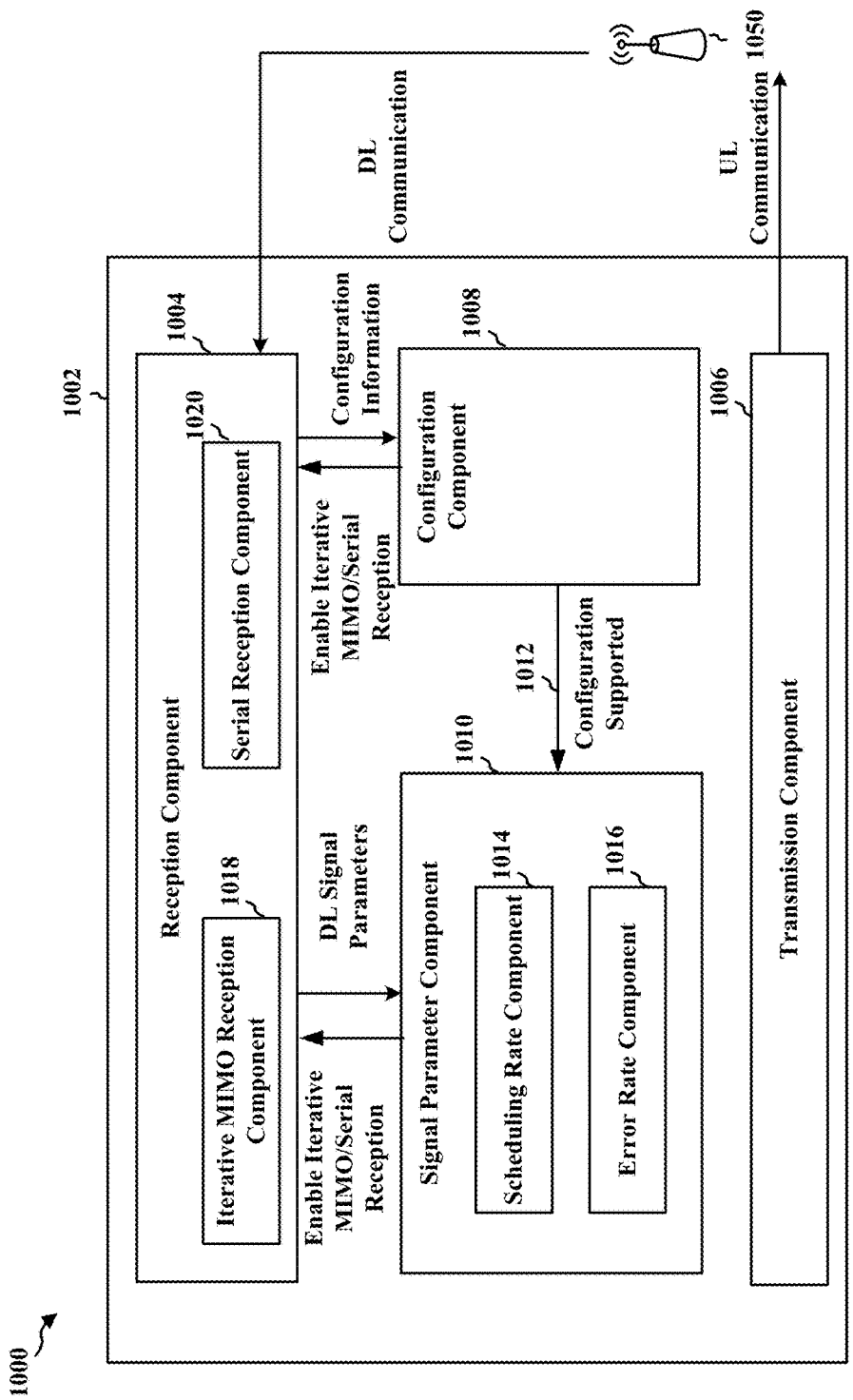
FIG. 10 is a conceptual data flow diagram illustrating the data flow between different means/components in an example apparatus.

FIG. 10 is a conceptual data flow diagram 1000 illustrating the data flow between different means/components in an exemplary apparatus 1002. The apparatus may be a UE (e.g., UE 104, 350). The apparatus includes a reception component 1004 that receives DL communication from eNB 1050, a transmission component 1006 that transmits UL communication to eNB 1050. The apparatus includes a configuration component 1008 that whether a current configuration of the UE supports iterative MIMO reception, e.g., at 902. When the configuration is supported, as indicated by at 1012, a signal parameter component 1010 determines whether at least one parameter of the received signal is within a corresponding target condition, respectively, for each of the at least one parameters. The signal parameter component 1010 may include a scheduling rate component that determines whether a percentage of scheduling is above a first threshold and an error rate component that determines whether an error rate is within a target range. Based upon the determinations at configuration component 1008 and/or signal parameter component 1010, these components enable either an iterative MIMO reception component 1018 or serial reception component 1020 or reception component 1004. The iterative MIMO reception component receives the DL signal from eNB 1050 using iterative MIMO reception, e.g., as described in FIG. 5. The serial reception component receives the DL signal from eNB 1050 using serial reception, e.g., as described in FIG. 4B.

The apparatus may include additional components that perform each of the blocks of the algorithm in the aforementioned flowcharts of FIGS. 7-9. As such, each block in the aforementioned flowcharts of FIGS. 7-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
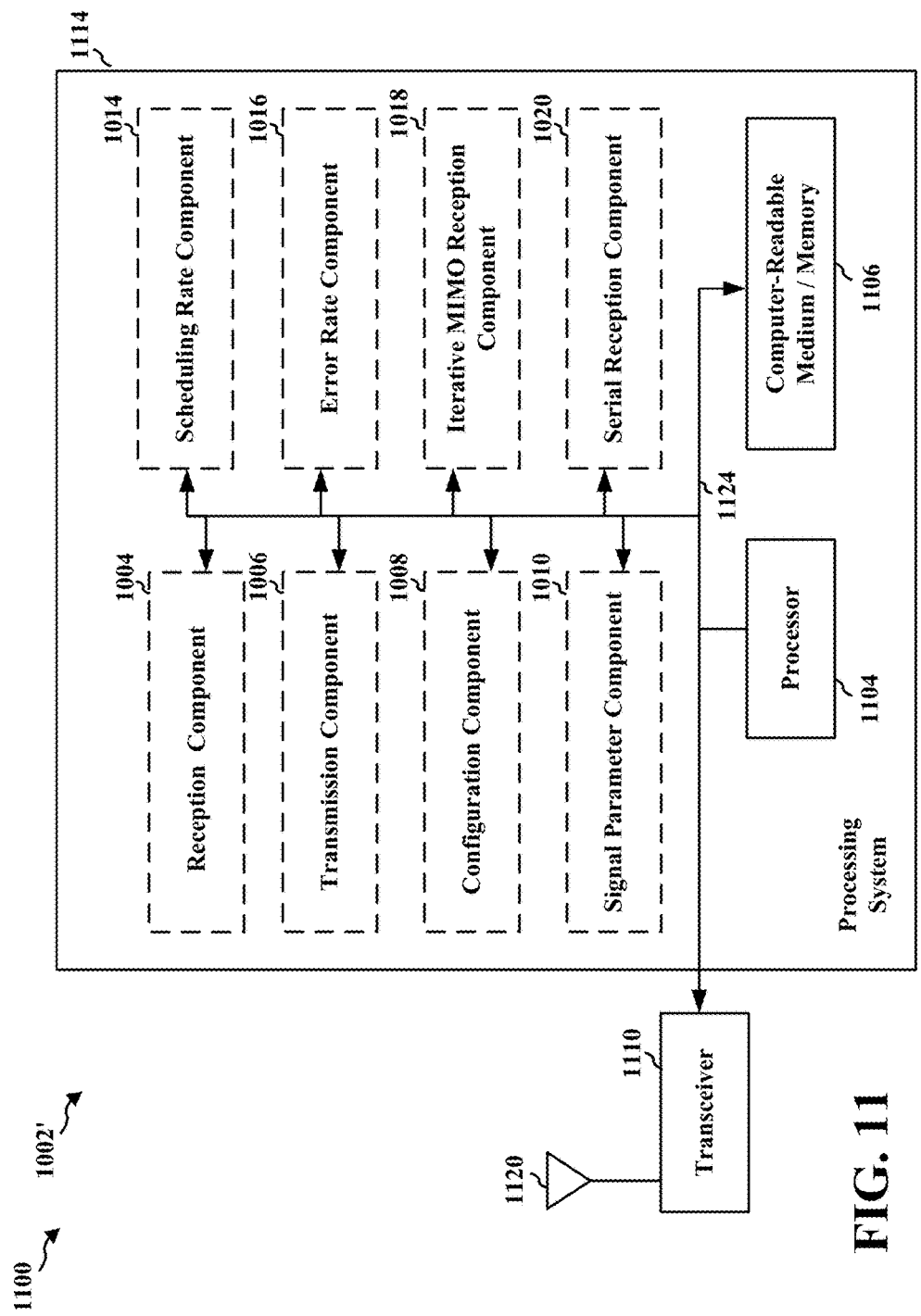
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1012, 1014, 1018, 1020 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1012, 1014, 1018, 1020. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for determining whether a current configuration of the UE supports iterative MIMO reception, means for determining whether at least one parameter of the received signal is within a corresponding target condition, respectively, for each of the at least one parameters, means for receiving a signal using serial reception, means for receiving a signal using iterative MIMO reception means for determining whether a percentage of scheduling is above a first threshold, means for determining whether an error rate is within a target range, means for determining whether a difference between a first error rate at the first iteration and an overall error rate meets an error rate change threshold, and means for transitioning between iterative MIMO reception and serial reception. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for performing tiered control of an iterative Multiple-Input Multiple-Output (MIMO) receiver at a user equipment (UE), comprising:
   determining whether a current configuration of the UE supports iterative MIMO reception; and
   when it is determined that the current configuration of the UE supports iterative MIMO reception, determining whether at least one parameter of a received signal is within a corresponding target condition, respectively, for each of the at least one parameters,
   wherein determining whether at least one parameter of the received signal is within the corresponding target condition comprises determining whether a percentage of scheduling is above a first threshold.

2. The method of claim 1, wherein when it is determined that the current configuration of the UE does not support iterative MIMO, the method includes receiving a signal using serial reception.

3. The method of claim 1, wherein when it is determined that the at least one parameter of the received signal is not within a corresponding target condition, the method includes receiving a signal using serial reception.

4. The method of claim 1, wherein determining whether at least one parameter of the received signal is within the corresponding target condition further comprises determining whether an error rate is within a target range.

5. The method of claim 4, wherein the received signal comprises multiple streams, and the method further comprises determining whether the error rate is within the target range individually for each of the multiple streams, and
   wherein if the error rate for at least one of the multiple streams is within the target range, the iterative MIMO receiver is used.

6. The method of claim 4, further comprising:
   determining whether a difference between a first error rate at a first iteration and an overall error rate meets an error rate change threshold;
   using the iterative MIMO receiver when the difference meets the error rate change threshold; and
   using a serial receiver when the difference does not meet the error rate change threshold.

7. The method of claim 1, further comprising:
   transitioning between iterative MIMO reception and serial reception depending on a periodic determination of whether at least one parameter of the received signal is within the corresponding target condition.

8. The method of claim 1, wherein the determination of whether the current configuration of the UE supports iterative MIMO reception is based on at least one of a number of reception antennas, a transmission mode, and a call type.

9. The method of claim 1, wherein an updated determination of whether the current configuration of the UE supports iterative MIMO reception is repeated when the current configuration of the UE changes.

10. An apparatus for wireless communication for performing tiered control of an iterative Multiple-Input Multiple-Output (MIMO) receiver at a user equipment (UE), comprising:
    means for determining whether a current configuration of the UE supports iterative MIMO reception; and
    means for determining whether at least one parameter of a received signal is within a corresponding target condition, respectively, for each of the at least one parameters, when it is determined that the current configuration of the UE supports iterative MIMO reception,
    wherein the means for determining whether at least one parameter of the received signal is within the corresponding target condition determines whether a percentage of scheduling is above a first threshold.

11. The apparatus of claim 10, further comprising:
    means for receiving a signal using serial reception, when it is determined that the current configuration of the UE does not support iterative MIMO or that the at least one parameter of the received signal is not within a corresponding target condition, the method includes receiving a signal using serial reception.

12. The apparatus of claim 10, wherein the means for determining whether at least one parameter of the received signal is within the corresponding target condition further determines
    whether an error rate is within a target range.

13. The apparatus of claim 12, further comprising:
means for determining whether a difference between a first error rate at a first iteration and an overall error rate meets an error rate change threshold,
wherein the iterative MIMO receiver is used when the difference meets the error rate change threshold and
a serial receiver is used when the difference does not meet the error rate change threshold.

14. The apparatus of claim 10, further comprising:
means for transitioning between iterative MIMO reception and serial reception depending on a periodic determination of whether at least one parameter of the received signal is within the corresponding target condition.

15. An apparatus for wireless communication for performing tiered control of an iterative Multiple-Input Multiple-Output (MIMO) receiver at a user equipment (UE), comprising:
a memory; and
at least one processor coupled to the memory and configured to:
determine whether a current configuration of the UE supports iterative MIMO reception; and
when it is determined that the current configuration of the UE supports iterative MIMO reception, determine whether at least one parameter of a received signal is within a corresponding target condition, respectively, for each of the at least one parameters,
wherein determining whether at least one parameter of the received signal is within the corresponding target condition comprises determining whether a percentage of scheduling is above a first threshold.

16. The apparatus of claim 15, wherein determining whether at least one parameter of the received signal is within the corresponding target condition further comprises determining whether an error rate is within a target range.

17. The apparatus of claim 16, wherein the received signal comprises multiple streams, and the at least one processor is further configured to determine whether the error rate is within the target range individually for each of the multiple streams, and
wherein if the error rate for at least one of the multiple streams is within the target range, the iterative MIMO receiver is used.

18. The apparatus of claim 16, wherein the at least one processor is further configured to:
determine whether a difference between a first error rate at a first iteration and an overall error rate meets an error rate change threshold;
use the iterative MIMO receiver when the difference meets the error rate change threshold; and
use a serial receiver when the difference does not meet the error rate change threshold.

19. The apparatus of claim 15, wherein the at least one processor is further configured to:
transition between iterative MIMO reception and serial reception depending on a periodic determination of whether at least one parameter of the received signal is within the corresponding target condition.

20. A non-transitory computer-readable medium storing computer executable code for performing tiered control of an iterative Multiple-Input Multiple-Output (MIMO) receiver at a user equipment (UE), comprising code to:
determine whether a current configuration of the UE supports iterative MIMO reception; and
when it is determined that the current configuration of the UE supports iterative MIMO reception, determine whether at least one parameter of a received signal is within a corresponding target condition, respectively, for each of the at least one parameters,
wherein determining whether at least one parameter of the received signal is within the corresponding target condition comprises determining whether a percentage of scheduling is above a first threshold.

21. The non-transitory computer-readable medium of claim 20, wherein determining whether at least one parameter of the received signal is within the corresponding target condition further comprises determining whether an error rate is within a target range.

22. The non-transitory computer-readable medium of claim 21, wherein the received signal comprises multiple streams, the computer-readable medium further comprising code to:
determine whether the error rate is within the target range individually for each of the multiple streams, and
wherein if the error rate for at least one of the multiple streams is within the target range, the iterative MIMO receiver is used.

23. The non-transitory computer-readable medium of claim 21, further comprising code to:
determine whether a difference between a first error rate at a first iteration and an overall error rate meets an error rate change threshold,
use the iterative MIMO receiver when the difference meets the error rate change threshold and
use a serial receiver when the difference does not meet the error rate change threshold.

24. The non-transitory computer-readable medium of claim 20, further comprising code to:
transition between iterative MIMO reception and serial reception depending on a periodic determination of whether at least one parameter of the received signal is within the corresponding target condition.

* * * * *